United States Patent
Bouvet

(10) Patent No.: US 9,521,168 B2
(45) Date of Patent: Dec. 13, 2016

(54) METHOD FOR MANAGING RECORDS IN AN IMS NETWORK, AND S-CSCF SERVER IMPLEMENTING SAID METHOD

(75) Inventor: Bertrand Bouvet, Perros-Guirec (FR)

(73) Assignee: FRANCE TELECOM, Paris (FR)

( * ) Notice: Subject to any disclaimer, the term of this patent is extended or adjusted under 35 U.S.C. 154(b) by 427 days.

(21) Appl. No.: 13/636,593

(22) PCT Filed: Mar. 15, 2011

(86) PCT No.: PCT/FR2011/050523
§ 371 (c)(1),
(2), (4) Date: Sep. 21, 2012

(87) PCT Pub. No.: WO2011/117510
PCT Pub. Date: Sep. 29, 2011

(65) Prior Publication Data
US 2013/0019003 A1    Jan. 17, 2013

(30) Foreign Application Priority Data
Mar. 23, 2010   (FR) ...................... 10 52060

(51) Int. Cl.
*G06F 15/173*     (2006.01)
*H04L 29/06*      (2006.01)

(52) U.S. Cl.
CPC ....... *H04L 65/1016* (2013.01); *H04L 65/1073* (2013.01)

(58) Field of Classification Search
CPC ............. H04L 29/06; H04L 29/12188; H04L 29/06333; H04L 61/103; H04L 67/14; H04L 7/00; H04L 63/10; H04L 49/90; H04L 65/1073; H04Q 7/20

USPC ........ 370/254, 351; 709/220, 223, 228, 230, 709/227
See application file for complete search history.

(56) References Cited

U.S. PATENT DOCUMENTS

| 392,581 | A | * | 11/1888 | Arnold .......................... 112/19 |
| 6,732,168 | B1 | * | 5/2004 | Bearden et al. ............. 709/223 |
| 6,795,447 | B2 | * | 9/2004 | Kadambi et al. ............ 370/412 |
| 6,871,233 | B1 | * | 3/2005 | Bearden et al. ............. 709/226 |
| 7,099,926 | B1 | * | 8/2006 | Ims et al. ...................... 709/217 |

(Continued)

FOREIGN PATENT DOCUMENTS

| WO | 2009/052870 A1 | 4/2009 |
| WO | 2009/054661 A1 | 4/2009 |

(Continued)

OTHER PUBLICATIONS

English translation of the Written Opinion dated Sep. 25, 2012 for corresponding International Application No. PCT/FR2011/050523, filed Mar. 15, 2011.

(Continued)

*Primary Examiner* — Hua Fan
(74) *Attorney, Agent, or Firm* — David D. Brush; Westman, Champlin & Koehler, P.A.

(57) ABSTRACT

A method and apparatus are provided for management of registrations in an IMS network. The method includes: creating, for a given public identity, at least two registration queues, each one being associated with a registration policy; receiving a registration message sent by a terminal having the public identity; and assigning one of the registration queues to the terminal on the basis of a field included in the message.

7 Claims, 2 Drawing Sheets

(56) References Cited

U.S. PATENT DOCUMENTS

| | | | |
|---|---|---|---|
| 7,155,215 B1* | 12/2006 | Miernik et al. | 455/423 |
| 7,480,254 B2* | 1/2009 | Mayer | 370/254 |
| 8,392,581 B2* | 3/2013 | Ait-Ameur et al. | 709/227 |
| 2003/0210668 A1* | 11/2003 | Malladi et al. | 370/335 |
| 2004/0196796 A1* | 10/2004 | Bajko et al. | 370/310 |
| 2004/0205212 A1* | 10/2004 | Huotari et al. | 709/230 |
| 2005/0201357 A1* | 9/2005 | Poyhonen | 370/352 |
| 2006/0256748 A1* | 11/2006 | Jung et al. | 370/328 |
| 2007/0162599 A1* | 7/2007 | Nguyen | 709/225 |
| 2007/0298794 A1* | 12/2007 | Cho | 455/435.1 |
| 2008/0039081 A1* | 2/2008 | Ma et al. | 455/433 |
| 2008/0045214 A1* | 2/2008 | Wen et al. | 455/435.1 |
| 2008/0095070 A1* | 4/2008 | Chan et al. | 370/254 |
| 2008/0155658 A1* | 6/2008 | Leinonen et al. | 726/4 |
| 2008/0227451 A1* | 9/2008 | Fukui et al. | 455/435.1 |
| 2009/0100147 A1* | 4/2009 | Igarashi | 709/218 |
| 2009/0163176 A1* | 6/2009 | Hasegawa | 455/411 |
| 2009/0191873 A1 | 7/2009 | Siegel | |
| 2009/0225746 A1* | 9/2009 | Jackson et al. | 370/352 |
| 2011/0028130 A1* | 2/2011 | Swaminathan et al. | 455/414.1 |

FOREIGN PATENT DOCUMENTS

| | | |
|---|---|---|
| WO | 2009/155987 A1 | 12/2009 |
| WO | 2010/006643 A1 | 1/2010 |

OTHER PUBLICATIONS

International Search Report and Written Opinion dated May 24, 2011 for International Patent Application No. PCT/FR2011/050523, filed Mar. 15, 2011.

* cited by examiner

METHOD FOR MANAGING RECORDS IN AN IMS NETWORK, AND S-CSCF SERVER IMPLEMENTING SAID METHOD

CROSS-REFERENCE TO RELATED APPLICATIONS

This Application is a Section 371 National Stage Application of International Application No. PCT/FR2011/050523, filed Mar. 15, 2011, which is incorporated by reference in its entirety and published as WO 2011/117510 on Sep. 29, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to the field of telecommunications networks of the IMS type (IP Multimedia Subsystem) such as defined by the 3GPP (Third Generation Partnership Project).

BACKGROUND OF THE DISCLOSURE

One of the objectives of the IMS is to allow a user to access various services whatever his type of IP connectivity.

IMS networks, initially designed for mobile networks, tend to be developed with the highest priority on fixed access networks notably of the ADSL (Asymmetric Digital Subscriber Line) type, or FTTH (Fiber-to-the-home), or cable networks.

IMS architectures for fixed networks have, in particular, been deployed for the marketing of solutions known as "Multiplay", allowing a user to access various services of the IMS network, and notably for Internet access, voice over IP (VoIP) and television over internet (IPTV) services via a domestic gateway.

In order to diversify their offer, the telecommunications operators now provide terminals complementary to the landline telephone, these complementary terminals being equipped with voice-over-IP (VoIP) software using at least the same public identifier IMPU as that of the domestic gateway and a private identifier IMPI which may or may not be the same as that of the domestic gateway.

It is recalled in this regard that, in order to register in an IMS network core, a terminal sends to this S-CSCF server (Serving Call State Control Function) responsible for the management of the registrations, a registration request notably comprising the two aforementioned identifiers.

The IMPI (IP Multimedia Private Identity) is an identifier allowing a terminal to be identified, this identifier also being used for the authentication of this terminal to the IMS network core, this authentication also requiring another parameter known to those skilled in the art under the name "SIP Password".

The IMPU (IP Multimedia Public Identity) is the public identifier associated with the terminal, for example a telephone number.

It will be noted that these aforementioned identifiers IMPI, IMPU and the aforementioned parameter SIP Password can be stored in a configuration file downloaded by the domestic gateway when it boots up.

In practice, in the prior art, after attaching itself to a domestic gateway, an SIP terminal obtains an IP address from a DHCP server integrated into this gateway, solicits a specialized server to download its VoIP configuration file comprising the aforementioned identifiers IMPI, IMPU, and SIP password then the domain name of the IMS network in order to request its registration in the IMS network core.

In a known manner, after obtaining an IP address from the network, for example via a DHCP server, the VoIP software stack of the domestic gateway initially registers in the core of the IMS network then subsequently re-registers with a period defined by a parameter EXPIRES typically of the order of one hour.

Each of these successive registrations consists in supplying to the IMS network core, aside from the information linked to the authentication, two pieces of information composed of:
  a parameter AoR (Address of Record) corresponding to the public identity IMPU representative of the logical address at which said terminal can be contacted; and
  a parameter AoC (Address for Contact) corresponding to the IP address and to the port number of this terminal representative of the physical address at which said terminal can be contacted.

Since several terminals having the same public identity IMPU (domestic gateway, fixes or mobiles of voice-over-IP fixed or mobile terminals, etc.) can make a request to be registered in the S-CSCF server, the manufacturers of S-CSCF entities have set up means for monitoring the number of SIP registrations for the same identity IMPU.

This monitoring can notably consist in:
  setting a maximum number of terminals that can register with the same public identity IMPU; and in
  implementing a policy to be applied in the case where several SIP registration requests carrying the same public identity IMPU are received.

A known policy notably consists in limiting the number of terminals that can register in the network core with the same public identity IMPU and in unregistering the terminal that had registered first, in order to allow a new terminal to register, according to a FIFO (First In First Out) mechanism.

The aforementioned complementary terminals can notably be mobile terminals connected to the domestic gateway by a wireless connection of the Wifi type.

Owing to their mobility, the management of the registration of these terminals in the IMS network poses a particular problem. Indeed, if a mobile terminal leaves the Wifi area and re-enters the latter, it will not be automatically unregistered when leaving the Wifi area but, when it re-enters, it will re-register in the network core with potentially a new contact address, and these successive registration attempts can lead to the rejection of the domestic gateway and that of other already registered terminals, by application of the policy of the FIFO type mentioned hereinabove.

In order to avoid this problem, one solution consists in verifying, with the specialized server mentioned hereinabove, whether the maximum number of terminals carrying the same public identity IMPU has already been registered within the IMS network, and in refusing the registration of the complementary terminal if this is already the case by not supplying it with its VoIP configuration parameters (IMPU, IMPI, password notably).

In order to obtain this information, the specialized server must interrogate the SLF (Service Location Function) in the case of an extensive IMS network in order to find out on which HSS the IMPU is hosted, then the HSS (Home Subscriber Service) in order to find out on which S-CSCF server the gateway and/or at least one SIP terminal carrying the public identity IMPU are registered, then once the identification of the S-CSCF has been obtained, the specialized server uses a method defined in the Internet Engineering Task Force (IETF) SIP specification RFC3261 which consists in sending to the S-CSCF an SIP REGISTER request having as parameters the public identity IMPU and a contact address ="*". The response generated by the S-CSCF, 200 OK, supplies a list that can contain from 0 to n contact addresses and, for each one of them, the value of the remaining duration of registration.

This solution is not very satisfactory because it increases the complexity of the processing operations of the specialized server, generates complementary loading in the SLF, HSS and the S-CSCF, and requires physical data streams to be opened within the firewalls between the aforementioned servers which weakens the overall level of security. In addition, this method leads to unavailability of the VoIP service for the VoIP terminals, typically when a terminal is not able to unregister itself in the network core upon loss of IP connectivity (loss of WiFi), or when the terminal must be rebooted. In this case, since the configured maximum number of registrations is already reached, the VoIP configuration parameters are not supplied to the terminal for the maximum duration equal to the value of the field Expires globally configured within the S-CSCF. Similarly, this unavailability of service can be generated by the gateway itself, the currently known gateways not having the possibility of unregistering themselves following a reboot.

SUMMARY

An embodiment of the invention relates to a method for management of the registrations in an IMS network, this method comprising:

a step for creation, for a given public identity, of at least two registration queues, each one being associated with a registration policy;

a step for receiving a registration message sent by a terminal having said public identity;

a step for assignment of one of said registration queues to said terminal on the basis of a discriminating parameter included in said message.

In a correlated fashion, an embodiment of the invention also relates to an S-CSCF server comprising:

means for creation, for a given public identity, of at least one registration queue associated with a registration policy;

means for receiving a registration message sent by a terminal having said public identity;

means for assigning one of said registration queues to said terminal on the basis of a discriminating parameter included in said message.

The method for management of the registrations according to an embodiment of the invention and the S-CSCF server do not exhibit the drawbacks of those of the prior art.

The idea of an embodiment of the invention is, indeed very advantageously, to manage several registration queues independently, each of these queues being associated with a registration policy.

Of course, two registration queues may be associated with the same policy.

In one particular embodiment of the invention, one of the aforementioned registration queues is a queue of the FIFO type comprising at the most one registration, this queue being reserved for a terminal of the domestic gateway type.

One registration queue is thus reserved for the domestic gateway.

This feature advantageously allows the rejection of the domestic gateway by the successive registrations of terminals accessing the IMS network with the same public identity IMPU to be avoided, the management of the registrations of these terminals being carried out by using another queue.

A registration queue can, in particular, group terminals of the same nature, in other words terminals generating similar events or edge effects.

The operator will be able to choose to group, within the same queue, the terminals to which he wishes to offer the same quality of service QoS.

For example, a queue with a single registration could be reserved for each of the terminals requiring a maximum availability, for example for domestic gateways. Thus, by isolating these terminals, the operator is sure that the latter will not be able to be ejected in the case of successive registrations of terminals with low priority having the same identity IMPU. For example, other queues could be provided for:

mobile VoIP terminals connected through WiFi; and terminals of the PC type equipped with voice-over-IP software (Softphone VoIP).

In one particular embodiment of the invention, a registration queue reserved for mobile terminals from a particular manufacturer can thus be used.

According to one particular embodiment of the invention, the discriminating parameter allowing the selection of the registration queue can be the parameter q defined in the document RFC3261 of the IETF.

As a variant, this discriminating parameter can also be a header comprising information on the type of terminal generating the registration message. This may for example be an SIP header, the field SIP User Agent defined in the document RFC3261 of the IETF, the field Call-Id which could be formatted in a manner specific to the type of terminal, or any other existing SIP field or to be created at the normalization level or a contact address for this terminal allowing the type of terminal to be identified with respect to its network address obtained via application of the IP network mask. Thus, for example, all the ranges of public IP addresses assigned by a VoIP service provider to each of the residential gateways offering a VoIP service can register themselves in a registration queue dedicated to the gateways, whereas all the other IP addresses used to form the contact address, for example those of a hot spot of another service provider, will use another registration queue.

In one particular embodiment of the invention, a registration policy associated with a given registration queue can be chosen from amongst:

a first policy for which no monitoring is carried out with regard to the number of registrations that can be registered in said queue;

a second policy defining a limit number of registrations in the registration queue, the latter being managed according to a method of the FIFO type;

a third policy consisting in rejecting any request for registration in said queue, beyond a limit number of registrations in said queue;

a fourth policy consisting in rejecting the terminal generating the least traffic over the network from said queue;

a fifth policy consisting in rejecting the terminal from said queue whose parameter q, defined in the document RFC3261 of the IETF, is the smallest.

In one particular embodiment, at least one of the registration queues is configured for supplying, via the field EXPIRES, a registration duration specific to this queue.

For example, the registration queue dedicated to the domestic gateway will be able to supply a value EXPIRES equal to 3600 seconds in the return code 200 OK of the REGISTER message, whereas for the registration queues of the SIP terminals connected behind this gateway, the value EXPIRES could be equal to 120 seconds. Indeed, for the domestic gateway to activate its NAT/PAT (Network Address Translation/Port Address Translation) function for these SIP terminals, it is necessary to generate regular traffic in order to maintain the NAT/PAT correspondence tables within the gateway.

In one particular embodiment, the management method according to the invention comprises a step for downloading, by the S-CSCF server, from an HSS server, a configuration file for the registration queue or queues usable by a public identity IMPU, this configuration file comprising, for each of these queues:
  the size of the registration queue;
  the registration policy associated with this queue;
  the discriminating parameter allowing the registration queue to be assigned to a particular terminal, and
  a value of the registration duration specific to this queue.

This solution allows the configuration of the various registration queues to be customized to each of the clients, and according to the content of their subscription to the VoIP service and to its various options.

According to this aspect, an embodiment of the invention also relates to an HSS server comprising a configuration file of the terminal or terminals usable with a public identity IMPU within an IMS network, said configuration file comprising, for at least one registration queue associated with this public identity:
  one queue number per IMPU
  the size of said registration queue;
  a discriminating parameter allowing the queue to be assigned to a terminal;
  a registration policy associated with this queue; and
  a value of registration duration specific to this queue.

In one particular embodiment of the invention, it is possible to provide a 'default queue' where terminals not possessing any discriminating parameter can go to register, this queue being configured in terms of registration number, of registration policy, and of EXPIRES value.

According to another aspect, an embodiment of the invention also relates to a registration message from a terminal in an IMS network, this message comprising a discriminating parameter constituting a criterion, for an S-CSCF server of this IMS network, for selecting a registration queue from amongst a plurality of registration queues associated with a public identity of the terminal generating said message.

In one particular embodiment, the various steps of the method for management of registrations are determined by computer program instructions.

As a consequence, an embodiment of the invention is also aimed at a computer program on an information media, this program being capable of being implemented by an S-CSCF server or, more generally, by a computer, this program comprising instructions designed for the implementation of the steps of the method for management of registrations such as mentioned hereinabove.

This program can use any programming language, and take the form of source code, object code, or code intermediate between source code and object code, such as in a partially compiled form, or in any other desired form.

An embodiment of the invention is also aimed at an information media readable by a computer, and comprising instructions of a computer program such as mentioned hereinabove.

The information media may be any entity or device capable of storing the program. For example, the media can comprise a storage means, such as a ROM, for example a CD ROM or a microelectronic circuit ROM, or again a magnetic recording means, for example a diskette (floppy disk) or a hard disk.

On the other hand, the information media may be a transmissible media such as an electrical or optical signal, which can be carried via an electrical or optical cable, by radio or by other means. The program according to an embodiment of the invention may in particular be downloaded over a network of the Internet type.

Alternatively, the information media can be an integrated circuit into which the program is incorporated, the circuit being designed to execute or to be used in the execution of the method in question.

BRIEF DESCRIPTION OF THE DRAWINGS

Other features and advantages will become apparent from the description presented hereinbelow with reference to the appended drawings which illustrate one exemplary non-limiting embodiment of it. In the figures:

FIG. 3 shows a registration message according to one particular embodiment of the invention.

DETAILED DESCRIPTION OF ILLUSTRATIVE EMBODIMENTS

Figure 1:
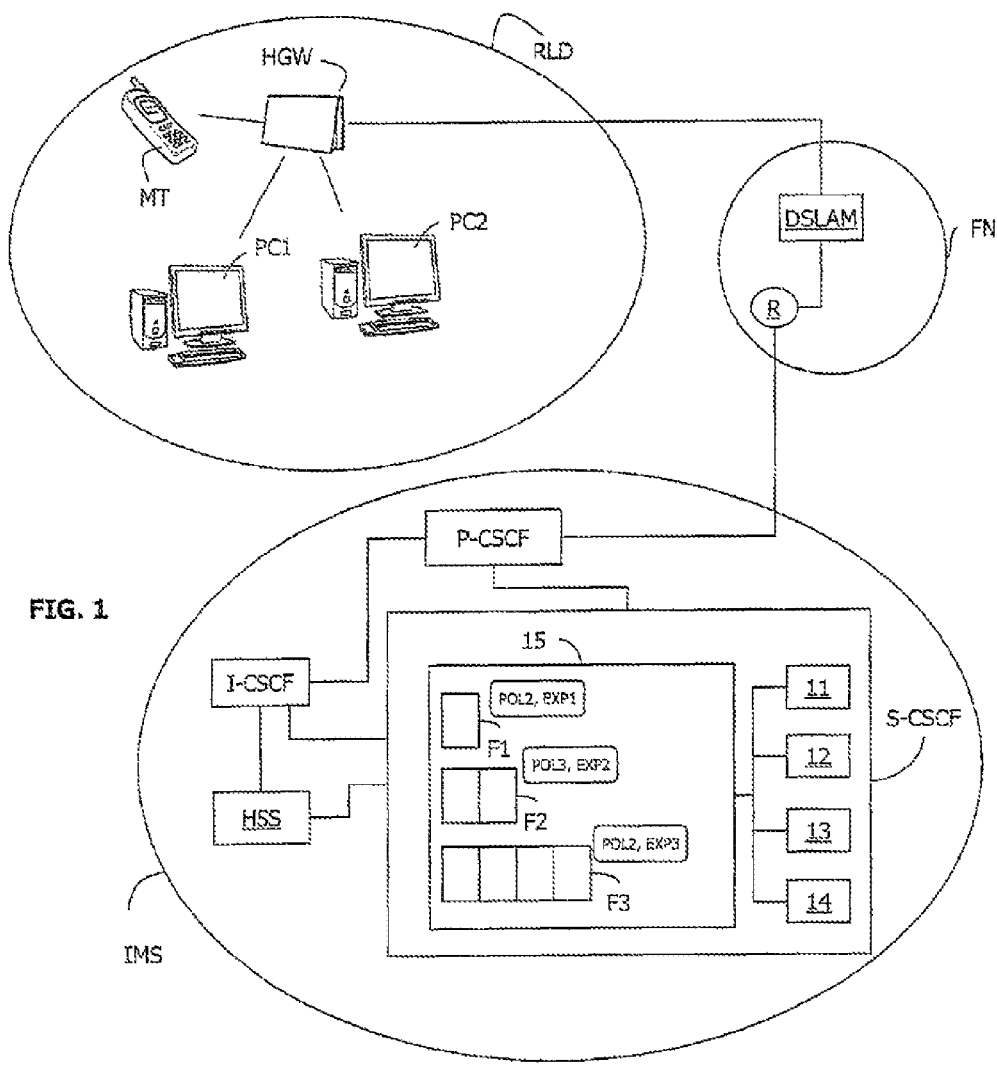
FIG. 1 shows, in its environment, an S-CSCF server according to the invention in one particular embodiment.

FIG. 1 shows an S-CSCF server according to an embodiment of the invention in its environment.

In this figure, a domestic gateway HGW is shown forming the interface between a fixed network FN and a domestic local network RLD.

A mobile terminal MT and two computers PC1, PC2 are connected to the domestic gateway HGW, these three terminals having the same public identifier IMPU (IP Multimedia Public Identity).

In a known manner, this gateway HGW allows the terminals MT, PC1 and PC2 to logon to the entities of the IMS network (IP Multimedia Subsystem) by using the SIP
  (Session Initiation Protocol) protocol.

In the exemplary embodiment described here, such a session logon passes notably through the following equipment:
  a device DSLAM, known equipment of the fixed network FN having the main function of recovering the stream of data transiting over the telephone lines to which it is connected and of multiplexing these data in order to direct them to the IMS network;

a certain number of routers R for the fixed network; and in the IMS network, SIP entities of the P-CSCF Proxy-SIP and S-CSCF type, SIP server responsible notably for the signaling and for the session monitoring, and I-CSCF (Interrogating Call Session Control Function).

In a known manner, the IMS network also comprises an HSS (Home Subscriber Server) entity which stores the service profiles attached to the client IMS account then, optionally, in one embodiment of the invention, the profiles of the registration queues allowing the gateway HGW and the authorized terminals MT, PC1, PC2 to be registered.

Consequently, in one particular embodiment, the management method according to the invention allows a step for downloading, by said S-CSCF server, from an HSS server, a configuration file for at least one registration queue associated with the public identity IMPU, this configuration file comprising, for each of said registration queues:
- a size for this registration queue;
- a registration policy associated with this queue;
- the discriminating parameter allowing this registration queue to be assigned to a terminal, and
- a value of registration duration specific to this queue.

In the embodiment described here, the hardware architecture of the S-CSCF server is that of a conventional computer.

It notably comprises a processor 11, a volatile memory 12 of the RAM type, a non-volatile memory 13 of the ROM type and means 14 for communicating over the IMS network known to those skilled in the art.

Figure 2:
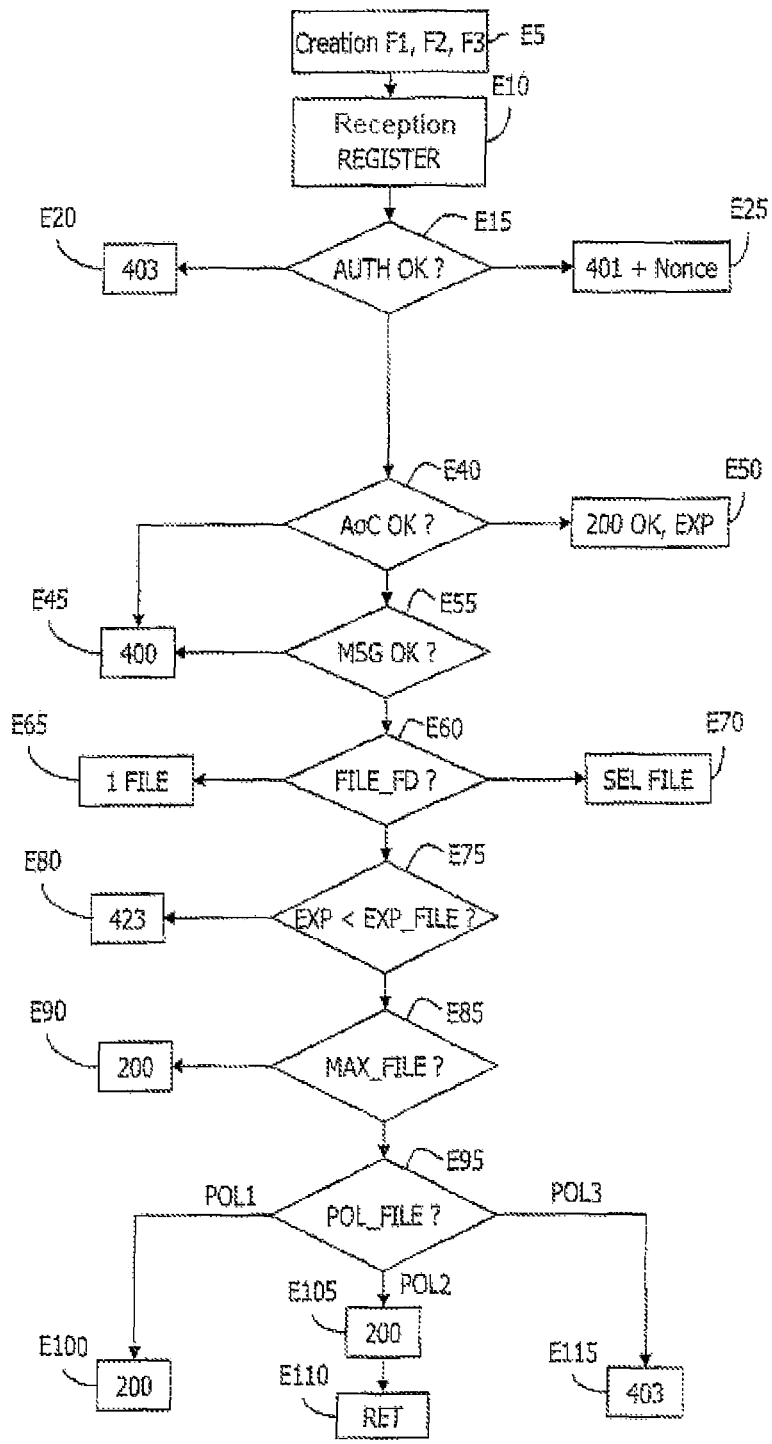
FIG. 2 shows, in the form of a flow diagram, the main steps of a method for management of the registrations according to one particular embodiment of the invention.

The non-volatile memory 13 of the ROM type constitutes a recording media according to an embodiment of the invention on which a computer program according to an embodiment of the invention is recorded, the main steps of which are shown in the form of a flow diagram in FIG. 2.

The volatile memory 12 of the RAM type allows this computer program to be executed by the processor 11.

According to an embodiment of the invention, the S-CSCF server manages several registration queues F1, F2, F3 for the public identity IMPU of the terminals MT, PC1, PC2.

In one particular embodiment of the invention, the parameterization of the wait queues F1, F2, F3 is stored in a re-writable non-volatile memory 15 of the S-CSCF server, for example a hard disk.

In the embodiment described here, the parameterization of the queues F1, F2, F3 is in the HSS and downloaded into the volatile memory 12 of the S-CSCF server during the first registration request from a terminal having the public identity IMPU.

In the exemplary embodiment described here, the registration queue F1 is reserved for the domestic gateway HGW; it comprises at the most one registration, and operates according to a policy POL2 of the FIFO (First In First Out) type.

The second registration queue F2 is associated with the voice-over-IP (VoIP) computers PC1, PC2; it comprises at the most two registrations and implements a blocking policy POL3.

The third registration queue F3 is associated with the mobile voice-over-IP terminals (Mobile VoIP); it comprises at the most four registrations and also implements the policy POL2 of the FIFO type.

In the embodiment described here, the S-CSCF server creates these registration queues F1, F2, F3 in a static manner within its RAM memory 12.

According to an embodiment of the invention, the S-CSCF server is capable, upon receiving an SIP registration REGISTER message sent by the gateway HGW or a terminal MT, PC1, PC2, of selecting the registration queue F1, F2, F3 associated with this terminal and of implementing, for this terminal, the registration policy associated with this queue.

With reference to FIG. 2, the main steps E5 to E115 of a registration method according to an embodiment of the invention will now be described.

This method can be implemented by the S-CSCF server in FIG. 1.

In this example, this method comprises a first step E5 for creation of registration queues F1, F2, F3.

It will now be assumed that the S-CSCF server receives, during a step E10, a registration message according to an embodiment of the invention, this message being sent by a terminal MT, PC1, PC2 of the domestic local network RLD, or else from the gateway HGW, it being recalled that all these terminals have the same public identity IMPU.

By way of example, a registration message according to an embodiment of the invention is given in FIG. 3.

In addition to the conventional fields of an SIP REGISTER message (IMPU, Authentication, etc.), according to an embodiment of the invention, this message comprises a field FILE_FD which contains a discriminating parameter allowing the S-CSCF server to select a registration queue F1, F2, F3 for the terminal generating this message.

This discriminating parameter may for example be composed of:
- the parameter 'q' defined by the document RFC3261 of the IETF standard, this parameter known to those skilled in the art taking a real value in the range between 0 and 1 in order to give the priority to the terminal for the 'Forking' function when an incoming call destined for the IMPU is presented to the S-CSCF server; it is recalled that the 'Forking' mechanism allows all the terminals registered in the IMS core carrying the same public identity IMPU to be called in parallel or sequentially depending on this priority 'q';
- the SIP header (Header SIP User Agent) having the function of supplying information on the type of terminal sending the request (name of supplier, type of terminal, software version of the SIP stack, etc.);
- the contact address (AoC) of this terminal, and
- the Call-Id specifically formatted for each terminal.

The steps E10 to E55 are the conventional steps of a method for processing an SIP REGISTER message such as implemented in an S-CSCF entity of the prior art.

They are therefore described hereinafter in a succinct manner.

Upon receiving the registration message (step E10), the S-CSCF server verifies, during a step E15, whether the authentication of the terminal generating this message is valid or not.

It is recalled that a registration request notably comprises an SIP header www-Authenticate which allows the terminal sending the request to be identified and authorized, this parameter being used for the authentication of the terminal in the IMS network core, according to the protocol HTTP Digest MD5 for example.

If the authentication fails because the content of the field www-Authenticate is invalid due to the use of an incorrect IMPI or SIP password, the result of the test E15 is negative; this test is then followed by a step E20 during which the S-CSCF server responds to the registration message by sending a response of the type 403 "Forbidden".

If the authentication fails because the registration REGISTER request does not comprise the field www-Authenticate or because the field Nonce is no longer valid, the result of the test E15 is negative and this test is followed by a step E25 during which the S-CSCF server responds to the registration request by sending a response 401 accompanied by a field Nonce. Thus, the terminal can resend a REGISTER message containing the field www-Authenticate whose content takes into account the value of Nonce returned in the 401.

When the authentication succeeds, the result of test E15 is positive and this test is followed by a test E40 during which the server S-CSCF verifies if the contact address AoC, corresponding to the IP address and to the number of the port over which the terminal can be contacted, is valid.

If this contact address is not valid, the result of the test E40 is negative and this test is followed by a step E45 during which the S-CSCF server responds to the REGISTER message by sending a response 400 "Invalid Request".

If the contact address AoC is composed of "*", the test E40 is followed by a step E50 during which the S-CSCF server responds to the REGISTER message by sending a response 200 OK, this response being accompanied, on the one hand, by an association ("binding") between the identity IMPU and the IP address of the terminal and its port number and, on the other hand, a duration supplied in the SIP field EXPIRES corresponding to the registration duration remaining. It should be noted that several 'bindings' may be returned within the response 200 OK if several terminals are registered with the same IMPU.

It is recalled that the duration EXPIRES is the duration by which the S-CSCF server defines the period that a terminal must adhere to between sending two successive REGISTER requests.

If the REGISTER message comprises a valid contact address AoC, and does not consist of "*", the result of the test E40 is positive and this test is followed by a step E55 during which the S-CSCF server verifies whether the other fields of the REGISTER message are valid.

If such is not the case, the test E55 is followed by the step E45, already described, for sending the response 400 "Invalid Request".

During a step E60, the S-CSCF server verifies whether the registration message received at the step E10 comprises or not a field FILE_FD comprising a discriminating parameter in the sense of an embodiment of the invention.

If such is not the case, the result of the test E60 is negative, and an embodiment of the invention is not implemented. As a variant, a default registration queue may be assigned to the terminal.

In this case, the S-CSCF server uses a single registration queue for all the terminals with the same identity IMPU, as in the prior art (step E65).

On the contrary, if the registration message received during the step E10 comprises the field FILE_FD, the S-CSCF server selects a queue depending on this field.

According to FIG. 1, the S-CSCF server chooses:
the registration queue F1 for the REGISTER messages sent by the domestic gateway HGW;
the registration queue F2 for the terminals PC1, PC2; and
the registration queue F3 for the mobile terminal MT.

Each of these registration queues is associated with a respective registration policy POL1, POL2, POL3.

In the embodiment described here, each registration queue F1, F2, F3 is also associated with a duration EXPIRES, respectively EXP1, EXP2 and EXP3.

It is recalled that the duration EXPIRES is the duration by which the S-CSCF server defines the period a terminal must adhere to between sending two successive REGISTER requests.

Consequently, in the embodiment described here, the registration method according to an embodiment of the invention comprises a step E75 during which the S-CSCF server verifies whether the REGISTER message received in the step E10 includes an SIP header Expires valued at a lower value than the parameter EXPIRES associated with the registration queue selected.

If such is not the case, the result of the test 75 is negative and, during a step E80, the S-CSCF server sends a response 423 "Interval too Brief" to the terminal having sent the registration request received at the step E10.

On the contrary, if the value EXPIRES present in the REGISTER message received at the step E10 is greater than or equal to that associated with the queue selected, the result of the test E75 is positive and this test is followed by a step E85 during which the S-CSCF server verifies whether the number of authorized registrations for the queue selected has already been reached or not.

If such is not the case, the result of the test E85 is negative, and this test is followed by a step E90 during which the S-CSCF server responds to the REGISTER message by sending a response message 200OK known to those skilled in the art, associated with the duration EXPIRES.

The terminal having sent the registration message is registered in the IMS network.

On the contrary, if the number of authorized registrations for the queue selected has already been reached, the result of the test E85 is positive.

This test is then followed by a step E95 during which the S-CSCF server implements the policy POL1, POL2, POL3 associated with the queue F1, F2, F3 selected in the step E70.

In the exemplary embodiment described here:
if the terminal sending the registration message is the gateway HGW, the policy POL2 is implemented (step E105). In this example, this policy consists in registering the domestic gateway HGW generating this message, and in unregistering (Step E110) that previously registered (wait queue F1 of the FIFO type with a single registration);
if the terminal sending the registration message is a fixed computer PC1, PC2, the blocking policy POL3 is implemented, the latter consisting in rejecting the terminal trying to register (Step E115) by sending a response 403 Forbidden; and
if the terminal sending the registration message is the mobile terminal MT, the policy POL2 is implemented with a FIFO queue having a maximum of four registrations.

Although the present disclosure has been described with reference to one or more examples, workers skilled in the art will recognize that changes may be made in form and detail without departing from the scope of the disclosure and/or the appended claims.

The invention claimed is:
1. A method for management of registration records in an IMS network, the method comprising:
a step of creating, for a given public identity, at least two registration queues, each one being associated with a respective registration records management policy and a terminal type parameter;

a step of a server device receiving a registration message sent by a terminal among a plurality of terminals having said public identity;

a step of the server device assigning one of said registration queues to said terminal on the basis of the terminal type parameter included in a field of said message; and a step of the server applying the registration records management policy associated with the assigned registration queue, the management policy defining a policy on which the terminal is registered in the queue, once the queue is assigned.

2. The method according to claim 1, wherein said registration records management policy associated with a given registration queue is chosen from amongst:

a first policy for which no monitoring is carried out with regard to a number of registrations that can be registered in said queue;

a second policy defining a limit number of registrations in said queue, the latter being managed according to a method of a FIFO type;

a third policy consisting in rejecting any request for registration in said queue, beyond a limit number of registrations in said queue;

a fourth policy comprising rejecting the terminal generating the least traffic over the network from said queue;

a fifth policy comprising rejecting the terminal from said queue whose parameter q, defined in the document RFC3261 of the IETF, is the smallest.

3. The method according to claim 2, wherein one of said registration queues is of a FIFO type, said one of said registration queues being reserved for a terminal of a domestic gateway type and comprising at most one registration.

4. The method according to claim 1, wherein said at least one registration queue is associated with a value of registration duration specific to said queue.

5. The method according to claim 1, comprising a step of downloading, by an S-CSCF server, from an HSS server, a configuration file for at least one registration queue associated with said public identity, said configuration file comprising, for each of said registration queues:

a size of said registration queue;

a registration records management policy associated with this queue;

the terminal type parameter allowing said registration queue to be assigned to a terminal, and a value of registration duration specific to said queue.

6. An S-CSCF server comprising:

a non-transitory computer-readable memory comprising instrucitons stored thereon;

a processor configured by the instructions to perform acts of:

creating, for a given public identity, at least two registration queues, each one being associated with a respective registration records management policy and a terminal type parameter;

receiving a registration message sent by a terminal among a plurality of terminals having said public identity; and assigning one of said registration queues to said terminal on the basis of the terminal type parameter included in a field included in said message; and applying the registration records management policy associated with the assigned registration queue, the management policy defining a policy on which the terminal is registered in the queue, once the queue is assigned.

7. Non-transitory recording media readable by a computer on which a computer program is recorded comprising instructions for execution of a method for management of registration records in an IMS network, the instructions comprising:

instructions configured to create, for a given public identity, at least two registration queues, each one being associated with a respective registration records management policy and a terminal type parameter;

instructions configured to receive a registration message sent by a terminal among a plurality of terminals having said public identity;

instructions configured to assign, with the computer, one of said registration queues to said terminal on the basis of the terminal type parameter included in a field of said message; and instructions configured to apply the registration records management policy associated with the assigned registration queue, the management policy defining a policy on which the terminal is registered in the queue, once the queue is assigned.

* * * * *

UNITED STATES PATENT AND TRADEMARK OFFICE
CERTIFICATE OF CORRECTION

PATENT NO. : 9,521,168 B2  
APPLICATION NO. : 13/636593  
DATED : December 13, 2016  
INVENTOR(S) : Bertrand Bouvet Page 1 of 1

It is certified that error appears in the above-identified patent and that said Letters Patent is hereby corrected as shown below:

In the Claims

In Column 12:
In Claim 6, Line 6, delete "instrucitons" and insert --instructions--

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*